(12) United States Patent
Furukawa et al.

(10) Patent No.: US 9,744,608 B2
(45) Date of Patent: Aug. 29, 2017

(54) WIRE ELECTRIC DISCHARGE MACHINE

(71) Applicant: FANUC Corporation, Yamanashi (JP)

(72) Inventors: Hiroyuki Furukawa, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 206 days.

(21) Appl. No.: 14/584,502

(22) Filed: Dec. 29, 2014

(65) Prior Publication Data
US 2015/0196964 A1 Jul. 16, 2015

(30) Foreign Application Priority Data
Jan. 15, 2014 (JP) .................................. 2014-005477

(51) Int. Cl.
*B23H 1/02* (2006.01)
*B23H 7/04* (2006.01)
*B23H 7/02* (2006.01)

(52) U.S. Cl.
CPC ............... *B23H 1/022* (2013.01); *B23H 7/02* (2013.01); *B23H 7/04* (2013.01); *B23H 2600/12* (2013.01)

(58) Field of Classification Search
CPC . B23H 1/02; B23H 1/024; B23H 7/02; B23H 7/04; B23H 2600/12
See application file for complete search history.

(56) References Cited

U.S. PATENT DOCUMENTS

| 5,317,122 | A |   | 5/1994  | Ito et al. |
|-----------|---|---|---------|-----------|
| 5,352,859 | A | * | 10/1994 | Kaneko ..................... B23H 7/20 219/69.13 |
| 5,753,882 | A | * | 5/1998  | Goto ........................ B23H 1/02 219/69.18 |
| 6,630,641 | B2| * | 10/2003 | Tamida .................. B23H 1/022 219/69.13 |
| 7,843,166 | B2| * | 11/2010 | Shimada ............. H02M 1/4208 307/65 |
| 2004/0124189 | A1 |  | 7/2004 | Murai et al. |
| 2005/0127041 | A1 |  | 6/2005 | Kobayashi et al. |
| 2005/0194947 | A1 |  | 9/2005 | Murai et al. |

(Continued)

FOREIGN PATENT DOCUMENTS

| EP | 2223764 A2 | 9/2010 |
| JP | 53-8899 A | 1/1978 |
| JP | 63-339815 A * | 12/1994 |

(Continued)

OTHER PUBLICATIONS

Machine translation of Japan Patent No. 63-339,815, Sep. 2016.*

(Continued)

*Primary Examiner* — Geoffrey S Evans
(74) *Attorney, Agent, or Firm* — Hauptman Ham, LLP

(57) ABSTRACT

A primary power supply charges a capacitor by turning on a switching element and, upon completion of charging, turns off the switching element. Then, an AC pulse voltage is applied to the gap between a wire electrode and a workpiece by alternately turning on and off a switching element present in a secondary power supply. After a dielectric breakdown occurs between the wire electrode and the workpiece, the switching element is turned on to connect the capacitor so that the capacitor supplies a pulse current for machining.

8 Claims, 6 Drawing Sheets

(56) References Cited

U.S. PATENT DOCUMENTS

2014/0062422 A1* 3/2014 Gonthier ............... H02J 7/0052
320/166

FOREIGN PATENT DOCUMENTS

| JP | 10-118846 A | 5/1998 |
|----|-------------|--------|
| JP | 11-347844 A | 12/1999 |
| JP | 2004-195562 A | 7/2004 |
| JP | 2005-246551 A | 9/2005 |
| JP | 2010-194693 A | 9/2010 |
| WO | 03/106088 A1 | 12/2003 |

OTHER PUBLICATIONS

Extended European Search Report dated Sep. 10, 2015, corresponding to European Patent Application No. 15150347.1.
Office Action mailed May 12, 2015, corresponding to Japanese patent application No. 2014-005477.

* cited by examiner

CALCULATION UNIT

WIRE ELECTRIC DISCHARGE MACHINE

RELATED APPLICATIONS

The present application claims priority to Japanese Application Number 2014-005477, filed Jan. 15, 2014, the disclosure of which is hereby incorporated by reference herein in its entirety.

BACKGROUND OF THE INVENTION

1. Field of the Invention

The present invention relates to a wire electric discharge machine.

2. Description of the Related Art

A wire electric discharge machine machines a workpiece into a desired shape by changing the relative position between the wire electrode and the workpiece while causing discharge by applying a voltage to the machining gap between the wire electrode and the workpiece. The machining results of the workpiece depend on its material, thickness, and so on, and an accuracy of several micrometers may be required in high accuracy machining.

When high accuracy machining results are required, after completion of the first machining, machining into the same machining shape is performed a plurality of times while changing the offset. The number of machining processes is determined depending on the required machining results such as the surface roughness and geometric accuracy of a machined product. Here, it is assumed that the first machining process is referred to as rough machining and the second and subsequent machining processes are referred to as finish machining.

First, rough machining will be described.

An exemplary pulse generation circuit of the machining power supply of a wire electric discharge machine is shown in FIG. 9. Reference numeral 1 indicates the machining power supply. An AC pulse voltage is applied to the gap between a wire electrode 10 and a workpiece 11 by alternately turning on and off switching elements 3, 4, 5, and 6 present in a secondary power supply 2. After the pulse voltage causes a dielectric breakdown between the wire electrode 10 and the workpiece 11, a primary power supply 7 applies a current pulse. Reference numerals 8 and 9 indicate switching power supplies.

Next, finish machining will be described.

Since finish machining does not require much machining energy, only the secondary power supply 2 is used for the machining. An AC pulse voltage is applied to the gap between the wire electrode 10 and the workpiece 11 to perform machining. The voltage value, pulse width, and frequency of the pulse voltage to be applied are determined depending on required machining results such as the surface roughness and geometric accuracy of a machined product.

In the conventional method described above, when finish machining (particularly, the second machining) is performed, the magnitude of machining energy becomes a problem. At the time when the first machining is completed, the surface roughness and geometric accuracy of the machined product is not highly precise. On the other hand, since an AC pulse voltage is applied only by the secondary power supply 2 in the second machining, the machining energy may become insufficient.

Although an approach that performs the second machining as in the first machining may be considered, even if an attempt is made to reduce the machining energy using the pulse generation method of the first machining, stable machining cannot be done. This is because there are variations in the response speed of MOS FETs used as switching elements and variations in elements of the control circuit for turning on and off the MOS FETs. Variations in elements of the control circuit may prevent on-off instructions from being transmitted as intended. Even if on-off instructions are stable, since switching elements also have variations in their responses to instructions, the on-off time may vary even for the same instruction for each of the switching elements.

Accordingly, the machining energy may become insufficient in the second machining such as finish machining and there is no method for supplying appropriate machining energy stably.

As described above, the wire electric discharge machine machines the workpiece into a desired shape by changing the relative position between the wire electrode and the workpiece while causing discharge by applying a voltage to the machining gap between the wire electrode and the workpiece. The machining results of the workpiece depend on its material, thickness, and so on, and an accuracy of several micrometers may be required in high accuracy machining.

When the wire electric discharge machine performs machining into a desired machining shape, if a high accuracy of several micrometers is not required, machining into the desired machining shape is performed only once to obtain machining results. In contrast, if high accuracy machining results are required, after the first machining is completed, machining into the same machining shape is performed a plurality of times while the offset is changed. The number of machining processes is generally determined depending on the required machining results such as the surface roughness and geometric accuracy of a machined product.

Here, it is assumed that the first machining process is referred to as rough machining and the second and subsequent machining processes are referred to as finish machining.

First, rough machining will be described.

An exemplary pulse generation circuit of the machining power supply of the wire electric discharge machine is shown in FIG. 9. The switching elements present in the secondary power supply 2 are turned on and off alternately to apply an AC pulse voltage to the gap between the wire electrode 10 and the workpiece. After the pulse voltage causes a dielectric breakdown between the wire electrode 10 and the workpiece 11, the primary power supply 7 applies a current pulse.

Rough machining requires much machining energy since it machines a workpiece that has not been machined yet. Strictly speaking, the machining can be performed only by the secondary power supply 2. However, as described in Japanese Patent Application Laid-Open No. 2004-195562, the structure including the primary power supply 7 and the secondary power supply 2 are generally used to improve the machining efficiency.

Next, finish machining will be described.

Since finish machining does not require much machining energy, only the secondary power supply 2 is used for the machining. An AC pulse voltage is applied to the gap between the wire electrode 10 and the workpiece 11 to perform machining. The voltage value, pulse width, and frequency of the pulse voltage to be applied are determined depending on the required machining results such as the surface roughness and geometric accuracy of a machined product.

When high accuracy machining is performed through a plurality of finish machining processes, the machining energy is generally made smaller with each subsequent machining. The second machining such as finish machining is performed with less machining energy than in the first machining such as rough machining and the third machining such as finish machining is performed with less machining energy than in the second machining. A technique for high accuracy finish machining is disclosed in Japanese Patent Application Laid-Open No. 2010-194693.

A problem with a prior art technique when the second machining such as finish machining is performed after the first machining such as rough machining is finished will be described. As preparation for the description, the switching elements for generating pulses in FIG. 9 will be described.

When the secondary power supply 2 applies an AC pulse voltage in rough machining and finish machining, switching with a high frequency in the range from hundreds of kilohertz to several megahertz is performed. In the switching with a high frequency, semiconductor switching elements such as MOS FETs are generally used.

In rough machining, the pulse input timing of the primary power supply 7 depends on the situation of a dielectric breakdown between the wire electrode 10 and the workpiece 11 caused by the AC pulse voltage of the secondary power supply 2. The pulse width for each pulse current of the primary power supply 7 is small (for example, several microseconds). Generally, semiconductor switching elements such as MOS FETs are also used for switching of the primary power supply 7.

A problem when the second machining such as finish machining is performed is the magnitude of machining energy. At the time when the first machining such as rough machining is completed, the accuracy of the surface roughness and geometric accuracy of the machined product is not highly precise. On the other hand, since an AC pulse voltage is applied only by the secondary power supply 2 in the second machining such as finish machining, the machining energy may become insufficient.

On the other hand, an approach that performs the second machining such as finish machining as in the first machining by reducing the machining energy may be considered. Even if an attempt is made to reduce the machining energy using the pulse generation method of the first machining, stable machining cannot be done. This is because there are variations in the response speed of MOS FETs used as switching elements and variations in elements of the control circuit for turning on and off the MOS FETs.

Generally, elements of the circuit each have variations in their characteristic values. Variations in elements of the control circuit may prevent on-off instructions from being transmitted as intended. In this case, the on-off time of switching elements of the primary power supply and the magnitude of a current pulse are changed.

Even if on-off instructions are stable, since the switching elements also have variations in their responses to the instructions, the on-off time may vary even for the same instruction for each of the switching elements. Accordingly, the magnitude of a current pulse is changed.

For the reasons described above, even if the pulse generation method for the first machining such as rough machining is used for the second machining such as finish machining, a stable pulse current cannot be supplied, thereby preventing stable machining. As described above, in the prior art technique, the machining energy may become insufficient when the second machining such as finish machining is performed after completion of the first machining such as rough machining and there is no method for supplying appropriate machining energy.

Machining using capacitor pulses in which a pulse current is stored in a capacitor is disclosed in, for example, Japanese Patent Application Laid-Open No. 2005-246551, but sufficient machining efficiency cannot be obtained because the capacitor is connected to only one polarity.

SUMMARY OF THE INVENTION

The present invention addresses the above problems of the prior art technique, with an object of providing a machining power supply unit of a wire electric discharge machine capable of supplying a pulse current using a capacitor for finish machining.

A wire electric discharge machine according to the present invention machines a workpiece into a desired shape by changing a relative position between a wire electrode and the workpiece while causing discharge by applying a voltage to a machining gap between the wire electrode and the workpiece. The wire electric discharge machine includes a secondary power supply including a DC power supply and a switching element, the secondary power supply being capable of applying an AC pulse voltage, a primary power supply including a DC power supply, a switching element, and a discharge capacitor, the discharge capacitor and the DC power supply being disconnectable, a voltage detection unit disposed between the wire electrode and the workpiece, a storage unit storing, in advance, a voltage value assumed when a dielectric breakdown occurs between the wire electrode and the workpiece, and a comparison unit configured to compare a detected voltage value with the voltage value stored in the storage unit, and, as a result of comparison by the comparison unit, when the detected voltage value is smaller than the voltage value stored in the storage unit, it is determined that a dielectric breakdown has occurred between the wire electrode and the workpiece and a pulse current is supplied using a discharge capacitor of the primary power supply.

A wire electric discharge machine according to the present invention machines a workpiece into a desired shape by changing a relative position between a wire electrode and the workpiece while causing discharge by applying a voltage to a machining gap between the wire electrode and the workpiece. The wire electric discharge machine includes a secondary power supply including a DC power supply and a switching element, the secondary power supply being capable of applying an AC pulse voltage, a primary power supply including a DC power supply, a switching element, and a discharge capacitor, the discharge capacitor and the DC power supply being disconnectable, the primary power supply is configured to charge the discharge capacitor bipolarly, a voltage detection unit disposed between the wire electrode and the workpiece, a storage unit storing, in advance, a voltage value assumed when a dielectric breakdown occurs between the wire electrode and the workpiece, and a comparison unit configured to compare a detected voltage value with the voltage value stored in the storage unit, and, as a result of comparison by the comparison unit, when the detected voltage value is smaller than the voltage value stored in the storage unit, it is determined that a dielectric breakdown has occurred between the wire electrode and the workpiece and a pulse current is supplied using a discharge capacitor of the primary power supply.

The present invention has the above structure and provides a machining power supply unit of a wire electric discharge machine that can supply a pulse current using a capacitor to finish machining.

BRIEF DESCRIPTION OF THE DRAWINGS

The objects and features described above and others of the present invention will become obvious from the descriptions in embodiments below with reference to attached drawings. Among the drawings.

DETAILED DESCRIPTION OF THE PREFERRED EMBODIMENTS

Figure 1:
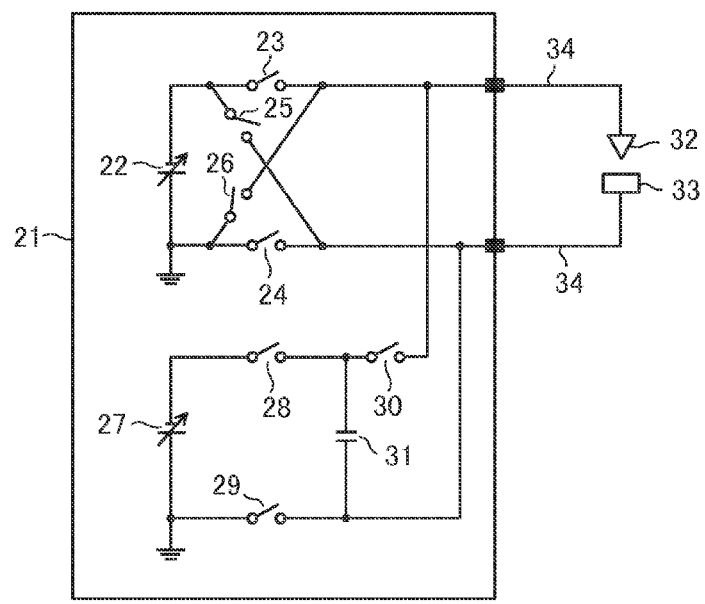
FIG. 1 shows a circuit that supplies a pulse current using a capacitor to finish machining according to embodiment 1 of the present invention.

In the present embodiment, a method for supplying a pulse current using a capacitor to finish machining is described. An example of a circuit is shown in FIG. 1. Switching elements 28 and 29 are turned on by a primary power supply 27 to charge a capacitor 31 in advance and, upon completion of the charging, the switching elements 28 and 29 are turned off. Then, switching elements 23, 24, 25, and 26 in a secondary power supply 22 are turned on and off alternately to apply an AC pulse voltage to the gap between a wire electrode 32 and a workpiece 33 via power feed lines 34. After the pulse voltage causes a dielectric breakdown between the wire electrode 32 and the workpiece 33, a switching element 30 is turned on to connect the capacitor 31. This causes the capacitor 31 to supply a pulse current for machining. The energy stored in the capacitor 31 can be managed by the capacity and charge voltage and a stable pulse current can be supplied. Accordingly, a problem of the prior art technique can be solved: appropriate machining energy cannot be supplied for the second machining such as finish machining.

Embodiment 1

Figure 2:
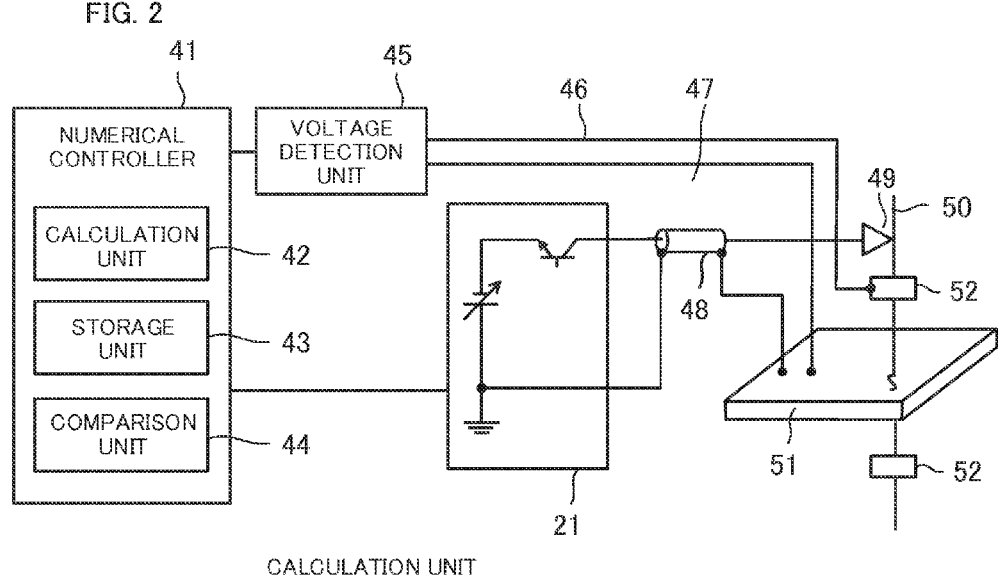
FIG. 2 shows the structure of a wire electric discharge machine according to the present invention.

The exemplary apparatus structure shown in FIG. 2 is achieved by adding a numerical controller 41, a calculation unit 42, a storage unit 43, a comparison unit 44, a voltage detection unit 45, a voltage detection lines 46 and 47, a power feed unit 49, and a wire electrode supporting unit 52 to a machining power supply 21 of the wire electric discharge machine in FIG. 1. Reference numeral 48 represents a power feed line.

In the apparatus structure in embodiment 1, the secondary power supply 22 applies an AC pulse voltage and the capacitor 31 can be charged monopolarly.

Figure 3:
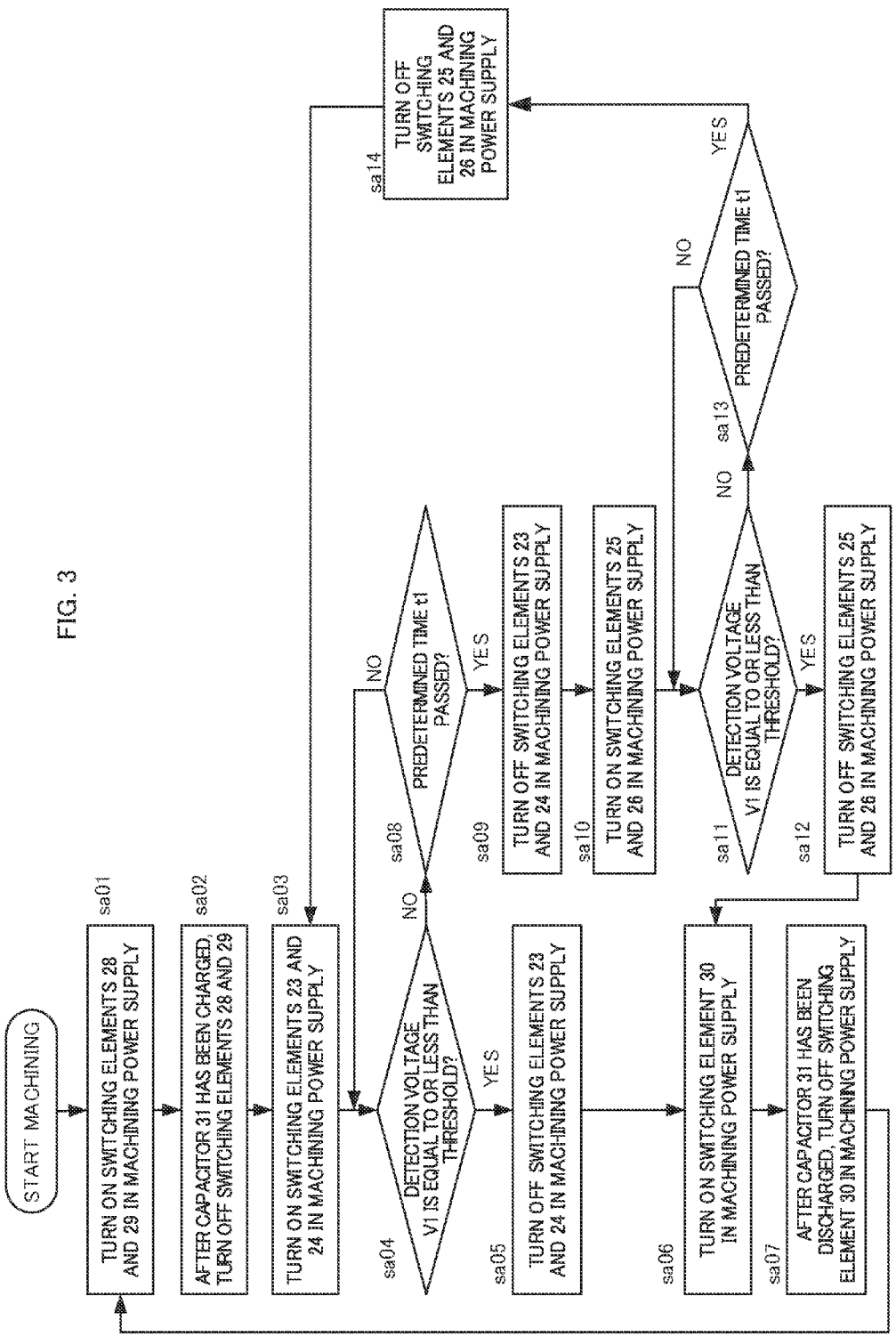
FIG. 3 is a flowchart showing processing according to embodiment 1 of the present invention.

Processing is performed according to the flowchart in FIG. 3.

After machining is started, the switching elements 28 and 29 in the machining power supply are first turned on to charge the capacitor 31 (sa01). Upon completion of the charging, the switching elements 28 and 29 are turned off (sa02).

Then, an AC pulse voltage is applied to a wire electrode 50 and a workpiece 51. The switching elements 23 and 24 in the machining power supply are turned on (sa03). This connects the workpiece 51 to the positive polarity side of the secondary power supply 22 and the wire electrode 50 to the negative polarity side of the secondary power supply 22 and a voltage is applied to the gap between the workpiece 51 and the wire electrode 50.

During application of the voltage, the voltage detection unit 45 detects the voltage between the workpiece 51 and the wire electrode 50. The detected voltage is sent to the numerical controller 41 and the calculation unit 42 converts the absolute value of the voltage value in the analog data format or the like into digital data.

The storage unit 43 stores the digital data of the absolute value of voltage value Vth assumed when a dielectric breakdown occurs between the wire electrode 50 and the workpiece 51, as the threshold of a dielectric breakdown.

If a dielectric breakdown does not occur, the power supply voltage of the secondary power supply 22 is applied to the gap between the wire electrode 50 and the workpiece 51 substantially as is. If a dielectric breakdown occurs, the wire electrode 50 is nearly connected electrically to the workpiece 51. Accordingly, the voltage is smaller than the power supply voltage of the secondary power supply 22.

The comparison unit 44 compares the value converted by the calculation unit 42 with the data stored, in advance, in the storage unit 43 (sa04). As a result of the comparison, if it is determined that a dielectric breakdown has occurred between the wire electrode 50 and the workpiece 51 (YES in sa04), the switching elements 23 and 24 in the machining power supply are turned off (sa05). Then, the switching element 30 is turned on and a pulse current from the capacitor 31 is supplied to the gap between the workpiece 51 and the wire electrode 50 (sa06). After the capacitor 31 has been discharged, the switching element 30 is turned off and the processing returns to the beginning of the sequence (sa07).

As a result of the comparison, if it is determined that a dielectric breakdown has not occurred between the wire electrode 50 and the workpiece 51 (NO in sa04), the processing is suspended for predetermined time t1 (sa08) and, if a dielectric breakdown occurs within predetermined time t1 (YES in sa04), the above operation is performed. If a dielectric breakdown does not occur within predetermined time t1 (YES in sa08), the switching elements 23 and 24 are turned off (sa09).

Then, the switching elements 25 and 26 are turned on (sa10). This connects the workpiece 51 to the negative polarity side of the secondary power supply 22 and the wire electrode 50 to the positive polarity side of the secondary power supply 22 and a voltage is applied to the gap between the workpiece 51 and the wire electrode 50.

During application of the voltage, the voltage detection unit 45 detects the voltage between the workpiece 51 and the wire electrode 50. The detected voltage is sent to the numerical controller 41 and the calculation unit 42 converts the absolute value of the voltage value (analog data) into digital data.

The comparison unit 44 compares the value converted by the calculation unit 42 with the data stored, in advance, in the storage unit 43 (sa11). As a result of the comparison, if it is determined that a dielectric breakdown has occurred between the wire electrode 50 and the workpiece 51 (YES in sa11), the switching elements 25 and 26 in the machining power supply are turned off (sa12). Then, the switching element 30 is turned on (sa06) and a pulse current from the capacitor 31 is supplied to the gap between the workpiece 51 and the wire electrode 50. After the capacitor 31 has been discharged, the switching element 30 is turned off and the processing returns to the beginning of the sequence (sa07).

As a result of the comparison, if it is determined that a dielectric breakdown has not occurred between the wire electrode 50 and the workpiece 51 (NO in sa11), the processing is suspended for predetermined time t1 (sa13) and, if a dielectric breakdown occurs within predetermined time t1, the above operation is performed. If a dielectric breakdown does not occur within predetermined time t1 (YES in sa13), the switching elements 25 and 26 are turned off (sa14). Then, the switching elements 23 and 24 are turned on again (sa03) to apply a voltage to the workpiece 51 and the wire electrode 50.

Figure 4:
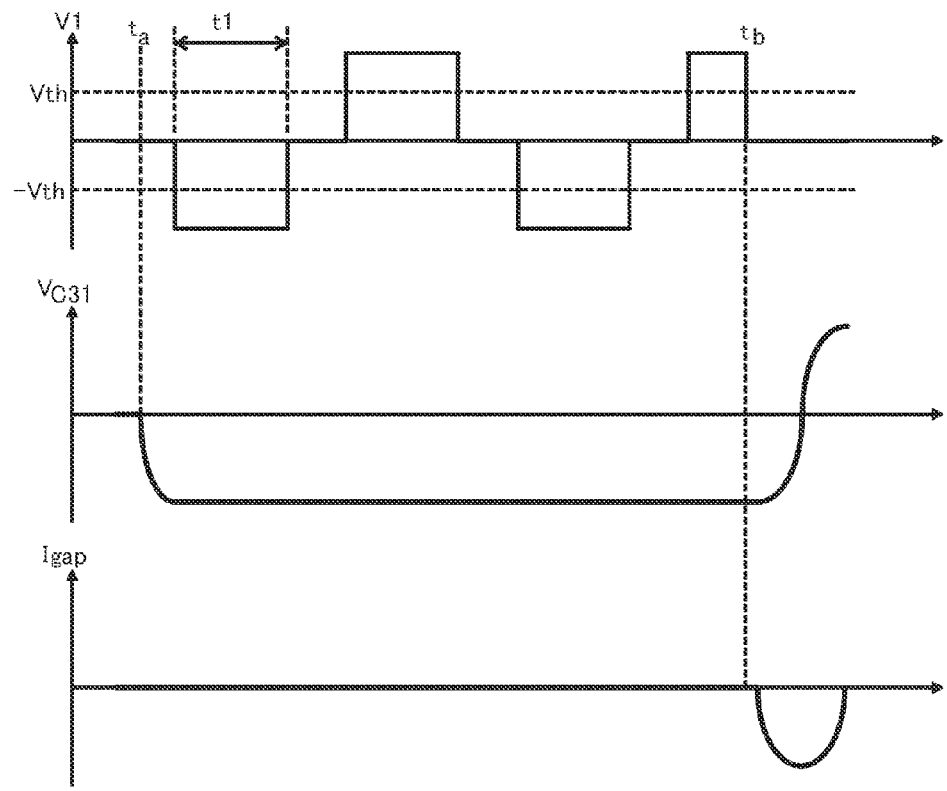
FIG. 4 shows detection voltage V1, charge voltage $V_{C31}$ of a capacitor 31, and current $I_{gap}$ flowing between a wire electrode and a workpiece when the processing of the flowchart shown in FIG. 3 is performed.

FIG. 4 simply indicates the above flow. The three waveforms represent detection voltage V1, charge voltage $V_{C31}$ of the capacitor 31, and current $I_{gap}$ flowing between the wire electrode 50 and the workpiece 51, respectively. The charging of the capacitor 31 starts at time $t_a$ and, upon completion of the charging, a pulse voltage with an alternating polarity from the secondary power supply is applied. If discharge by the secondary power supply does not occur within time t1, application of the voltage is aborted once and the voltage across the machining gap is set to zero. Then, a pulse voltage with the opposite polarity is applied. After that, this procedure is repeated. In this period, the charge voltage of the capacitor 31 is kept constant. If it is determined that the detection voltage becomes lower than threshold value Vth at time $t_b$, the switching element of the secondary power supply is turned off. Then, the switching element 30 of the primary power supply is turned on to supply a pulse current $I_{gap}$ from the capacitor 31 to the gap between the wire electrode 50 and the workpiece 51. Upon completion of the charging, the switching element 30 is turned off and the processing returns to the beginning of the sequence.

Embodiment 2

Figure 5:
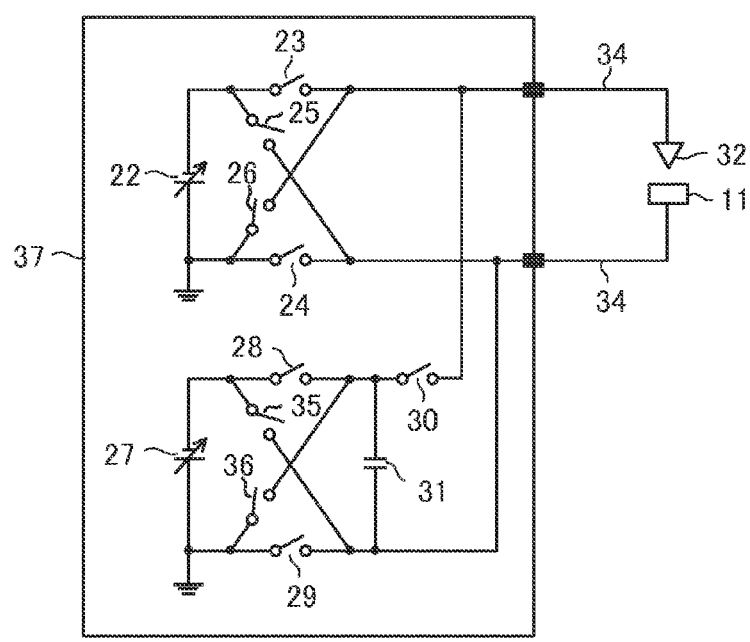
FIG. 5 shows a pulse generation circuit of a machining power supply of a wire electric discharge machine according to embodiment 2 of the present invention.
Figure 6:
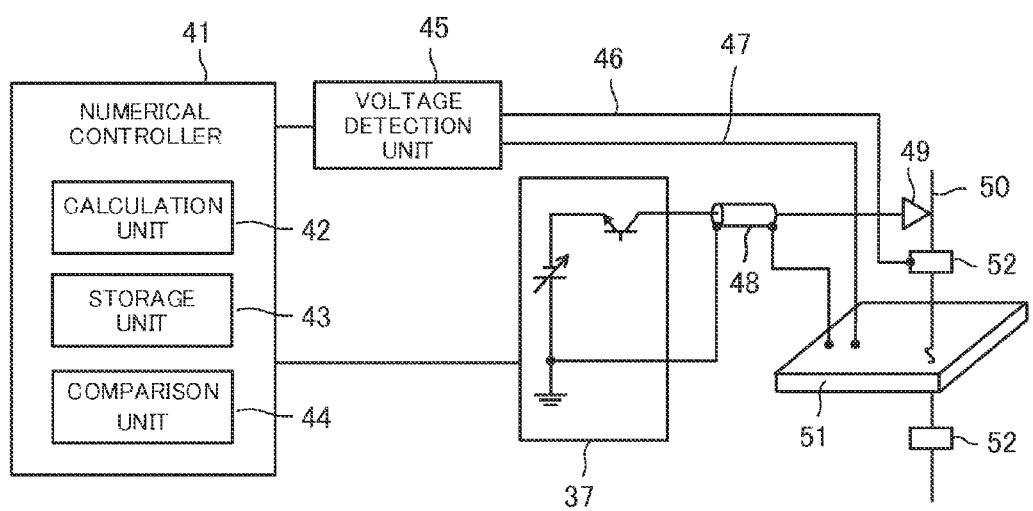
FIG. 6 shows a circuit that supplies a pulse current using a capacitor to finish machining.

The exemplary apparatus structure shown in FIG. 6 is achieved by adding the numerical controller 41, the calculation unit 42, the storage unit 43, the comparison unit 44, the voltage detection unit 45, the voltage detection lines 46 and 47, the power feed unit 49, and the wire electrode supporting unit 52 to a machining power supply 37 of the wire electric discharge machine in FIG. 5.

The difference between FIG. 1 and FIG. 5 is the circuit for charging the capacitor 31 of the primary power supply 27. Although the primary power supply in FIG. 1 can charge the capacitor only in one polarity direction, the primary power supply in FIG. 5 can charge the capacitor in both polarity directions.

In the apparatus structure according to embodiment 1, the secondary power supply 22 applies an AC pulse voltage. On the other hand, in the apparatus structure according to embodiment 2, the capacitor 31 can be charged bipolarly.

Figure 7:
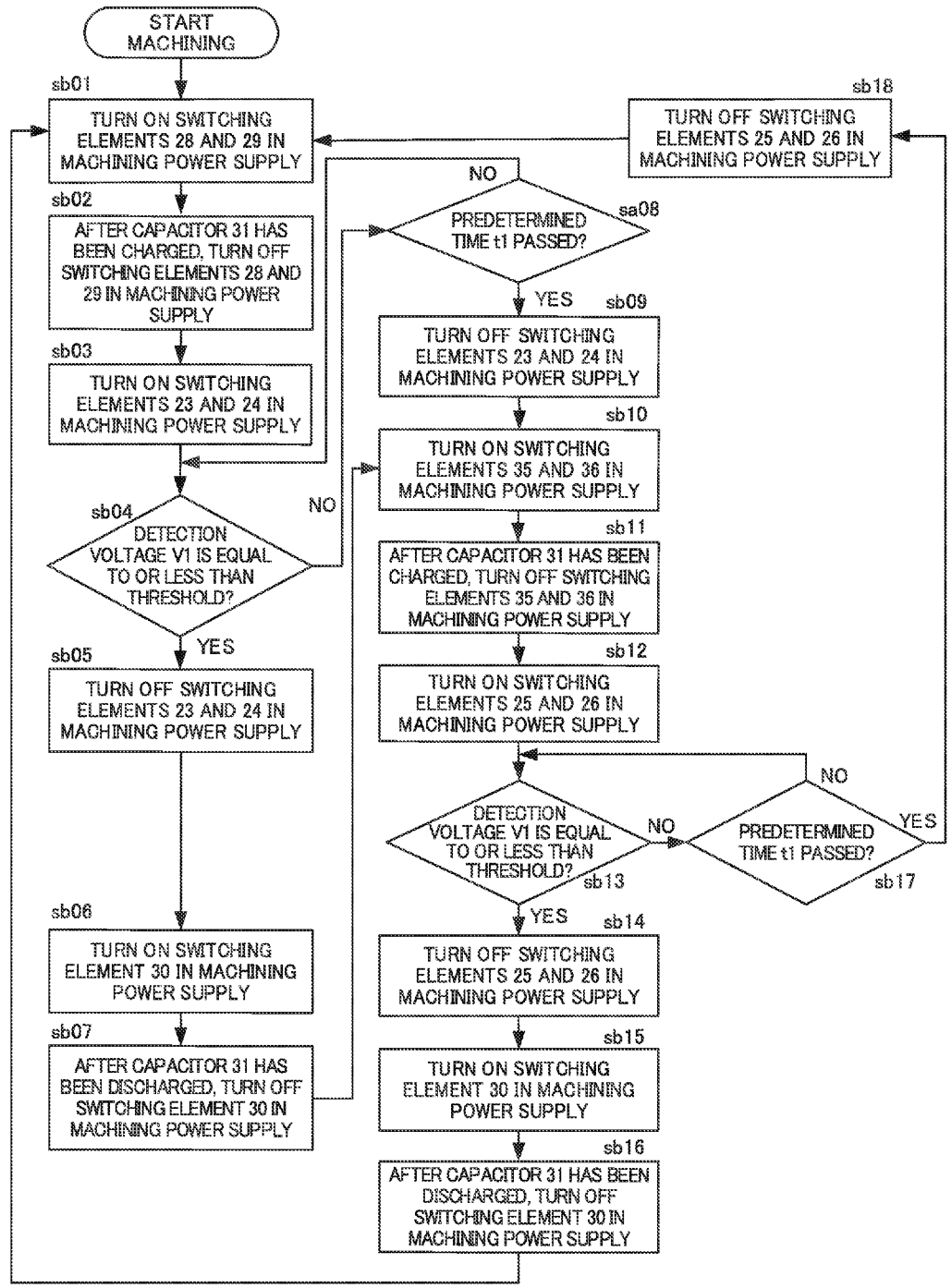
FIG. 7 is a flowchart showing processing according to embodiment 2 of the present invention.

Processing is performed according to the flowchart in FIG. 7.

After machining is started, the switching elements 28 and 29 in the machining power supply are first turned on to charge the capacitor 31 (sb01). Upon completion of the charging, the switching elements 28 and 29 are turned off (sb02).

Then, the secondary power supply 22 applies an AC pulse voltage to the wire electrode 50 and the workpiece 51.

The switching elements 23 and 24 in the machining power supply are turned on (sb03). This connects the workpiece 51 to the positive polarity side of the secondary power supply 22 and the wire electrode 50 to the negative polarity side of the secondary power supply 22 and a voltage is applied to the gap between the workpiece 51 and the wire electrode 50.

During application of the voltage, the voltage detection unit 45 detects the voltage between the workpiece 51 and the wire electrode 50. The detected voltage is sent to the numerical controller 41 and the calculation unit 42 converts the absolute value of the voltage value in the analog data format or the like into digital data.

The storage unit 43 stores the digital data of the absolute value of voltage value Vth assumed when a dielectric breakdown occurs between the wire electrode 50 and the workpiece 51, as the threshold of a dielectric breakdown.

If a dielectric breakdown does not occur, the power supply voltage of the secondary power supply 22 is applied to the gap between the wire electrode 50 and the workpiece 51 substantially as is. If a dielectric breakdown occurs, the wire electrode 50 is nearly connected electrically to the workpiece 51. Accordingly, the voltage is smaller than the power supply voltage of the secondary power supply 22.

The comparison unit 44 compares the value converted by the calculation unit 42 with the data stored, in advance, in the storage unit 43 (sb04).

As a result of the comparison, if it is determined that a dielectric breakdown has occurred between the wire electrode 50 and the workpiece 51 (YES in sb04), the processing proceeds to step sb05 of the flowchart. The switching elements 23 and 24 in the machining power supply are turned off (sb05), the switching element 30 is turned on (sb06), and a pulse current from the capacitor 31 is supplied to the gap between the workpiece 51 and the wire electrode 50. After the capacitor 31 has been discharged, the switching element 30 is turned off (sb07). Then, the processing proceeds to step sb10 of the flowchart.

As a result of the comparison, if it is determined that a dielectric breakdown has not occurred between the wire electrode 50 and the workpiece 51 (NO in sb04), the processing is suspended for predetermined time t1 and, if a dielectric breakdown occurs within predetermined time t1, the operation in step sb05 is performed. If a dielectric breakdown does not occur within predetermined time t1 (YES in sb08), the processing proceeds to step sb09 of the flowchart. The switching elements 23 and 24 are turned off (sb09). The switching elements 35 and 36 in the machining power supply are turned on (sb10). This charges the capacitor 31 in the machining power supply. The charge voltage of the capacitor 31 in this case has a polarity opposite to that used when the switching elements 28 and 29 are charged. After the capacitor 31 has been charged, the switching elements 35 and 36 are turned off (sb11). Then, the switching elements 25 and 26 are turned on (sb12). This connects, the workpiece 51 to the negative polarity side of the secondary power supply 22, and the wire electrode 50 to the positive polarity side of the secondary power supply 22, and a voltage is applied to the gap between the workpiece 51 and the wire electrode 50.

During application of the voltage, the voltage detection unit 45 detects the voltage between the workpiece 51 and the wire electrode 50. The detected voltage is sent to the numerical controller 41 and the calculation unit 42 converts the absolute value of the voltage value (analog data) into digital data. The comparison unit 44 compares the value converted by the calculation unit 42 with the data stored, in advance, in the storage unit 43 (sb13).

As a result of the comparison, if it is determined that a dielectric breakdown has occurred between the wire electrode 50 and the workpiece 51 (YES in sb13), the processing proceeds to step sb14 of the flowchart. The switching elements 25 and 26 in the machining power supply are turned off (sb14) and the switching element 30 is turned on (sb15), and a pulse current from the capacitor 31 is supplied to the gap between the workpiece 51 and the wire electrode 50. After the capacitor 31 has been discharged, the switching element 30 is turned off and the processing returns to the beginning of the sequence (sb16).

As a result of the comparison, if it is determined that a dielectric breakdown has not occurred between the wire electrode 50 and the workpiece 51 (NO in sb13), the processing is suspended for predetermined time t1 and, if a dielectric breakdown occurs within predetermined time t1 (YES in sb13), the operation in step sb14 is performed. If a dielectric breakdown does not occur within predetermined time t1 (YES in sb17), the processing proceeds to step sb18 of the flowchart. The switching elements 25 and 26 are turned off and the processing returns to the beginning of the sequence (sb18).

Figure 8:
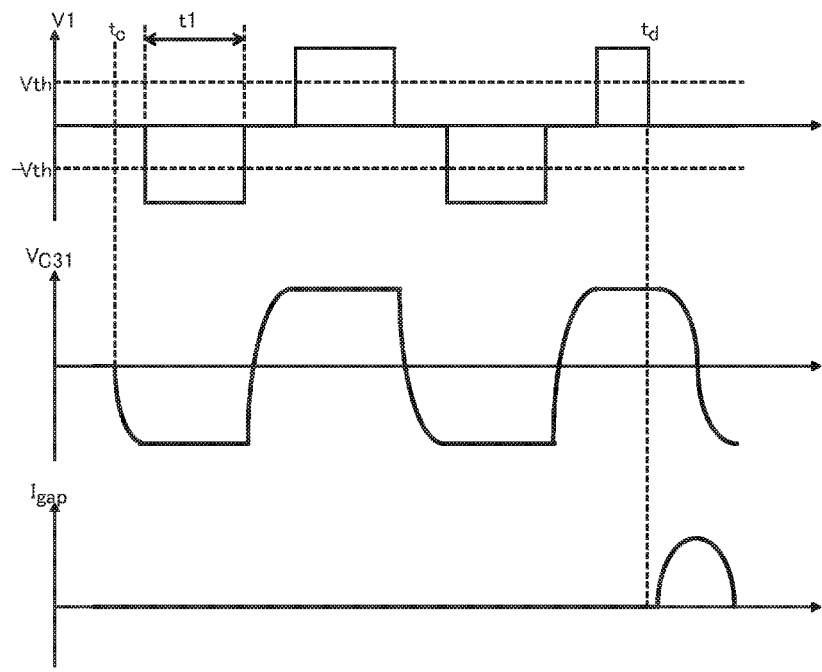
FIG. 8 shows detection voltage V1, charge voltage $V_{C31}$ of the capacitor 31, and current $I_{gap}$ flowing between the wire electrode and the workpiece when the processing of the flowchart shown in FIG. 7 is performed.
Figure 9:
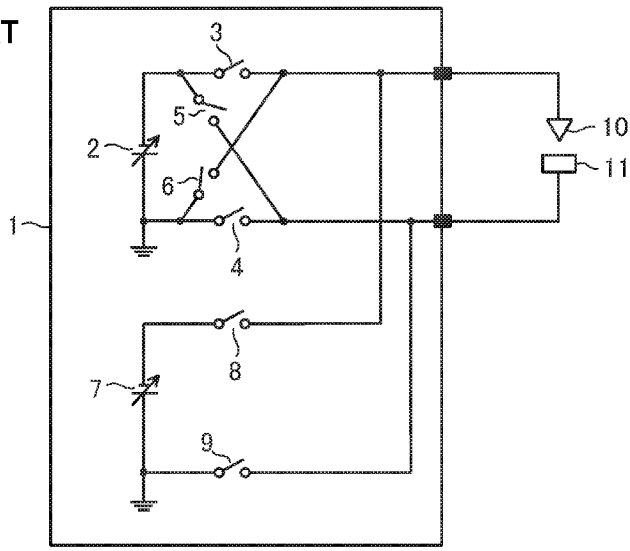
FIG. 9 shows a pulse generation circuit of a machining power supply of a conventional wire electric discharge machine.

FIG. 8 simply indicates the above flow. The three waveforms represent detection voltage V1, charge voltage $V_{C31}$ of the capacitor 31, and current $I_{gap}$ flowing between the wire electrode 50 and the workpiece 51, respectively.

The charging of the capacitor 31 starts at time $t_c$ and, upon completion of the charging, a pulse voltage with an alternating polarity from the secondary power supply is applied. If discharge by the secondary power supply 22 does not occur within time t1, application of the voltage is aborted once and the voltage across the machining gap is set to zero. Then, before a pulse voltage with the opposite polarity is applied, the capacitor 31 is charged with a voltage with the opposite polarity. As described above, the sequence is repeated so that the polarity of the secondary power supply 22 matches the polarity of the charge voltage of capacitor 31.

If it is determined that the detection voltage becomes smaller than threshold value Vth at time $t_d$, the switching element of the secondary power supply 22 is turned off. Then, the switching element 30 of the primary power supply 7 is turned on to supply pulse current $I_{gap}$ from the capacitor 31 to the gap between the wire electrode 50 and the workpiece 51. Upon completion of the charging, the switching element 30 is turned off and the processing returns to the beginning of the sequence.

The invention claimed is:

1. A wire electric discharge machine for machining a workpiece into a desired shape by changing a relative position between a wire electrode and the workpiece while causing discharge by applying a voltage to a machining gap between the wire electrode and the workpiece, the wire electric discharge machine comprising:

a secondary power supply including a DC power supply and a switching element, wherein the secondary power supply is configured to apply an AC pulse voltage;

a primary power supply including a DC power supply, a switching element, and a discharge capacitor, wherein the discharge capacitor and the DC power supply are configured to be connected with each other and to be disconnected;

a voltage detection unit disposed between the wire electrode and the workpiece; and a numerical controller, wherein the numerical controller includes a storage unit storing, in advance, a voltage value assumed when a dielectric breakdown occurs between the wire electrode and the workpiece, wherein the numerical controller is configured to compare a detected voltage value detected by the voltage detection unit with the voltage value stored in the storage unit, and wherein the numerical controller is configured to, as a result of the comparison, when the detected voltage value is smaller than the voltage value stored in the storage unit, determine that a dielectric breakdown has occurred between the wire electrode and the workpiece, and cause a pulse current to be supplied using the discharge capacitor of the primary power supply.

2. The wire electric discharge machine according to claim 1, wherein a polarity of the secondary power supply matches a polarity of a charge voltage of the discharge capacitor.

3. The wire electric discharge machine according to claim 1, wherein the numerical controller is configured to control machining of the workpiece in a first machining and a second machining subsequent to the first machining, and a machining energy for the second machining is smaller than a machining energy for the first machining.

4. The wire electric discharge machine according to claim 3, wherein both the primary power supply and the secondary power supply are configured to supply power in the first machining, and the secondary power supply is configured to supply power in the second machining, without the primary power supply supplying power in the second machining.

5. A wire electric discharge machine for machining a workpiece into a desired shape by changing a relative position between a wire electrode and the workpiece while causing discharge by applying a voltage to a machining gap between the wire electrode and the workpiece, the wire electric discharge machine comprising:

a secondary power supply including a DC power supply and a switching element, wherein the secondary power supply is configured to apply an AC pulse voltage;

a primary power supply including a DC power supply, a switching element, and a discharge capacitor, wherein the discharge capacitor and the DC power supply are configured to be connected with each other and to be disconnected, and the primary power supply is configured to charge the discharge capacitor bipolarly;

a voltage detection unit disposed between the wire electrode and the workpiece; and a numerical controller, wherein the numerical controller includes a storage unit storing, in advance, a voltage value assumed when a dielectric breakdown occurs between the wire electrode and the workpiece, wherein the numerical controller is configured to compare a detected voltage value detected by the voltage detection unit with the voltage value stored in the storage unit, and wherein the numerical controller is configured to, as a result of the comparison, when the detected voltage value is smaller than the voltage value stored in the storage unit, determine that a dielectric breakdown has occurred between the wire electrode and the workpiece, and cause a pulse current to be supplied using the discharge capacitor of the primary power supply.

6. The wire electric discharge machine according to claim 5, wherein the numerical controller is configured to control machining of the workpiece in a first machining and a second machining subsequent to the first machining, and a machining energy for the second machining is smaller than a machining energy for the first machining.

7. The wire electric discharge machine according to claim 6, wherein both the primary power supply and the secondary power supply are configured to supply power in the first machining, and the secondary power supply is configured to supply power in the second machining without the primary power supply supplying power in the second machining.

8. The wire electric discharge machine according to claim 5, wherein a polarity of the secondary power supply matches a polarity of a charge voltage of the discharge capacitor.

* * * * *